United States Patent [19]

Föhl

[11] Patent Number: 5,104,193
[45] Date of Patent: Apr. 14, 1992

[54] TIGHTENING MEANS FOR SAFETY BELT RESTRAINING SYSTEMS IN VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 589,636

[22] Filed: Sep. 28, 1990

[30] Foreign Application Priority Data

Oct. 9, 1989 [DE] Fed. Rep. of Germany ....... 3933724

[51] Int. Cl.$^5$ ............................................. B60R 21/00
[52] U.S. Cl. .................... 297/480; 297/479; 280/806
[58] Field of Search ................. 297/480, 472, 479; 280/806, 807, 801

[56] References Cited

U.S. PATENT DOCUMENTS

| | | | |
|---|---|---|---|
| 3,917,031 | 11/1975 | Dorin et al. | 297/480 X |
| 3,937,487 | 2/1976 | Peck | 297/480 X |
| 4,422,669 | 12/1983 | Chiba et al. | 297/480 X |
| 4,932,722 | 6/1990 | Motozawa | 297/480 |

FOREIGN PATENT DOCUMENTS

| | | | |
|---|---|---|---|
| 2330635 | 1/1974 | Fed. Rep. of Germany | 297/480 |
| 2540952 | 4/1977 | Fed. Rep. of Germany | 297/480 |
| 2726096 | 12/1978 | Fed. Rep. of Germany | 297/480 |

*Primary Examiner*—Laurie K. Cranmer
*Attorney, Agent, or Firm*—Tarolli, Sundheim & Covell

[57] ABSTRACT

The tightening means for safety belt restraining systems is equipped with a pyrotechnical piston/cylinder tightening drive which is inserted via fitting parts engaging the piston on the one hand and the cylinder on the other hand into the force flow path of the safety belt system. The cylinder is formed in a cylinder block which is guided displaceably parallel to the axis of the cylinder on a bodywork-fixed or vehicle-seat-fixed guide member. The piston is formed at the one end of a shear-stressable piston rod and in the readiness position of the tightening means is inserted with the piston rod into the cylinder. At its other end the piston rod is supported at the guide part. The release is by means of a vehicle-sensitive mechanical trigger mechanism. Instead of a return blocking mechanism is return brake is provided which reduces the stress peaks in the belt system.

20 Claims, 8 Drawing Sheets

TIGHTENING MEANS FOR SAFETY BELT RESTRAINING SYSTEMS IN VEHICLES

The invention relates to a tightening means for safety belt restraining systems in vehicles comprising a pyrotechnical piston/cylinder tightening drive which via fitting parts engaging the piston on the one hand and the cylinder on the other hand is inserted into the force flow path of the safety belt system.

Tightening means for safety belt restraining systems are known which engage the belt retractor and in the event of activation coil up a certain webbing length onto the belt retractor to remove the belt slack from the belt system.

However, belt tightening means are also known which are inserted directly into the force flow path of the safety belt system, for example in the form of a cylinder anchored to the vehicle bodywork and a piston which can be subjected therein to a pyrotechnical gas generator and to which a belt lock is connected via a piston rod. Such a tightening means operates substantially without loss and is also distinguished by a high response speed because it is inserted directly into the force flow path of the safety belt system; however, because of its large overall length it can hardly be integrated into conventional vehicles.

Tightening means comprising a mechanic tightening drive have also already been proposed. The tightening drive in these constructions is derived from a force accumulator such as a tensioned spring. Such a force accumulator has however a characteristic which drops relatively rapidly with the tightening travel so that towards the end of the tightening travel a satisfactory tightening force can be achieved only if the force accumulator or storage means is given correspondingly large dimensions. However, great difficulties are encountered in the defined release of such a strongly dimensioned force accumulator at a predetermined vehicle retardation.

The invention is based on the problem of making available a tightening means which generates a high tightening force, performs the tightening within a very short period of time and due to its small overall size and favourable shape can easily be integrated into conventional vehicles This problem is solved in a tightening means of the type indicated at the beginning according to the invention in that at least one cylinder of the piston/cylinder tightening drive is formed in a cylinder block which is guided displaceably parallel to the axis of the cylinder on a bodywork-fixed or vehicle-seat-fixed guide member, that the piston of the piston/cylinder drive is formed at the one end of a piston rod which is resistant to axial pressure, and in the readiness position of the tightening means is inserted with the piston rod into the cylinder and that the piston rod is supported with its other end at the guide member. In the tightening means according to the invention in the event of activation the piston does not move but the cylinder to which a fitting part, for example a belt lock fitting part, is secured. In the readiness state the piston with the piston rod is completely inserted into the cylinder so that the piston/cylinder tightening drive has an overall length which is hardly greater than the tightening travel. Since the tightening means is inserted directly into the force flow path of the safety belt system the tightening is effected substantially free of losses so that the tightening drive can be given smaller dimensions than in tightening means which engage the belt retractor. The necessary tightening forces are thus obtained with a piston/cylinder drive of correspondingly small dimensions in diameter and consequently the entire tightening drive requires only little overall size transversely of the tightening means as well.

Of particular advantage is an embodiment of the invention in which the cylinder is formed in a plate-shaped cylinder block. A particularly flat constructional form of the cylinder block is achieved if in accordance with a further advantageous embodiment two parallel spaced apart piston/cylinder units arranged in the same cylinder block are used which are adapted to be subjected to a common pyrotechnical gas generator. Since each individual piston/cylinder unit has a smaller diameter than a single piston/cylinder unit for the same tightening force the thickness of the plate-shaped cylinder block is further reduced.

The tightening means according to the invention offers favourable conditions for implementing an energy converter which diminishes load peaks in safety belt systems following the tightening operation. According to a further development of the invention it is provided that the piston/cylinder tightening drive forms at the same time a reverse brake which after tightening has taken place permits a return movement of the cylinder block in the direction of its starting position with energy conversion. Conventional tightening drives are provided with a return blocking mechanism. It has now been found that following the tightening phase a particularly favourable force profile free from load peaks results in the webbing system if instead of a return blocking mechanism a return brake is used which permits a controlled return movement of the cylinder block in the direction of its starting position with simultaneous conversion of kinetic energy to deformation work for plastic deformation of the cylinder block material. Such an energy-converting return brake can be implemented without additional expenditure in that between the piston and piston rod an encircling free space is created which is defined axially by a respective annular shoulder and radially inwardly by a cone surface of which the minor base is on the side of the piston and in the free space a plurality of roller elements are accommodated having a diameter which corresponds substantially to the mean radial depth of the free space, the braking function being effected in that the roller elements penetrate into the material of the cylinder wall and a plastic deformation thereof arises with formation of longitudinal grooves. The diameter and the number of the roller, elements as well as the material of the cylinder are adapted to each other in such a manner that a reproduceably defined return braking force is generated. It has been found that each individual roller element contributes an excellently reproduceable amount to the braking force so that the total braking force can be set by the number of roller elements. The diameter of the roller elements is dimensioned so that a predetermined penetration depth in the material of the cylinder block is achieved. For the cylinder block a relatively soft material is used, preferably aluminium or an aluminium alloy, the plastic deformation of which is easily manageable.

For a pyrotechnical gas generator a fuse is required. Conventional tightening means with pyrotechnical tightening drive are equipped with an electrical fuse which is activated via complicated electronics evaluating the vehicle retardation.

It has been found that the tightening means according to the invention can be equipped with a simple mechanical firing mechanism which responds directly in vehicle-sensitive manner and does not require complicated electronics or an electrical connecting line. Of particular advantage is that each tightening means, since it can be provided with its own mechanical firing mechanism, forms an autonomous unit.

A preferred embodiment of the mechanical firing mechanism includes a pivotally mounted vehicle-sensitive inertia mass, a spring-loaded pivotally mounted strike piece, a firing pin which is arranged with its free end lying opposite the impact fuse of the gas generator and with its other end lying opposite the strike piece, and a trigger mechanism which in the readiness state holds the strike piece at a distance from the opposite end of the firing pin and on vehicle-sensitive pivoting of the inertia mass after overcoming an inhibition threshold releases the strike piece which then under the action of the spring biasing is driven to the oppositely disposed end of the firing pin, strikes the latter and via the firing pin effects firing of the gas generator. The trigger mechanism is preferably constructed as roller blocking mechanism. Such a roller blocking mechanism includes a retaining roller mounted at the end of the strike piece remote from the firing pin, a release roller mounted on the inertia mass, a support roller mounted fixed with respect to the housing and a loose blocking roller held in the readiness state between retaining roller, release roller and support roller. In the readiness state the blocking roller assumes between the retaining roller and the support roller an over-deadcentre position in which it is held by the release roller. The release roller in turn is disposed in an over-deadcentre position in which it is supported by a housing-fixed abutment. On vehicle-sensitive pivoting of the inertia mass the release roller frees the blocking roller which is then thrown out between the support roller and retaining roller, the path of the retaining roller thereby being freed and the strike piece driven under the action of the spring biasing towards the firing pin.

Further features and advantages of the invention will be apparent from the following description of several embodiments and from the drawings to which reference is made and in which.

The embodiment of the tightening means described is intended for installation between a belt lock 10 and a (not shown) vehicle bodywork or vehicle seat. The mounting on the vehicle bodywork or on a vehicle seat is by means of a guide plate 12 which is provided with a bent up mounting fitting 14. Slidably mounted on the guide plate 12 is a generally plate-shaped cylinder block 16 which is of rectangular form in plan view and to the one longitudinal end of which the belt lock 10 is secured by means of a mounting bolt or pin 18 via a mounting fitting 20 of the belt lock 10. The shank 22 of the mounting pin 18 passes through an anchoring bore 24 of the cylinder block 16 and engages through a longitudinal slot 26 of the guide plate 12. The cylinder block 16 is preferably a pressed profile member of aluminium and at its one longitudinal side is provided with an integrally formed partially cylindrical edge strip 28. In the region of said edge strip 28 the cylinder block 16 is provided with a bore which forms a cylinder 30 which is open on the side of the belt lock 10 and which on the opposite side is bordered by an annular shoulder 32 and opens into a gas action passage 34 extending along a narrow side of the cylinder block 16. A piston 36 bears on the annular shoulder 32 and is connected via a conical shank 38 to a rigid piston rod 40. The piston rod 40 comprises at its end remote from the piston 36 an angled support part 42 which engages in form-locking manner into a corresponding opening 44 of the guide plate 12. In the readiness state shown in FIGS. 1 and 2 the piston 36, the shank 38 and the piston rod 40 are completely inserted into the cylinder 30. Only the support part 42 projects out of the cylinder 30 so that the piston is supported via the piston rod 40 at the guide plate 12. A cartridge-like gas generator 46 is inserted into the end of the gas action passage 34 remote from the piston 36 and open at the corresponding narrow side of the cylinder block 16. The gas generator 46 is provided with an impact fuse 48 which is arranged opposite the one end of a firing pin 50 of a firing mechanism to be described later.

Figures 1, 2:
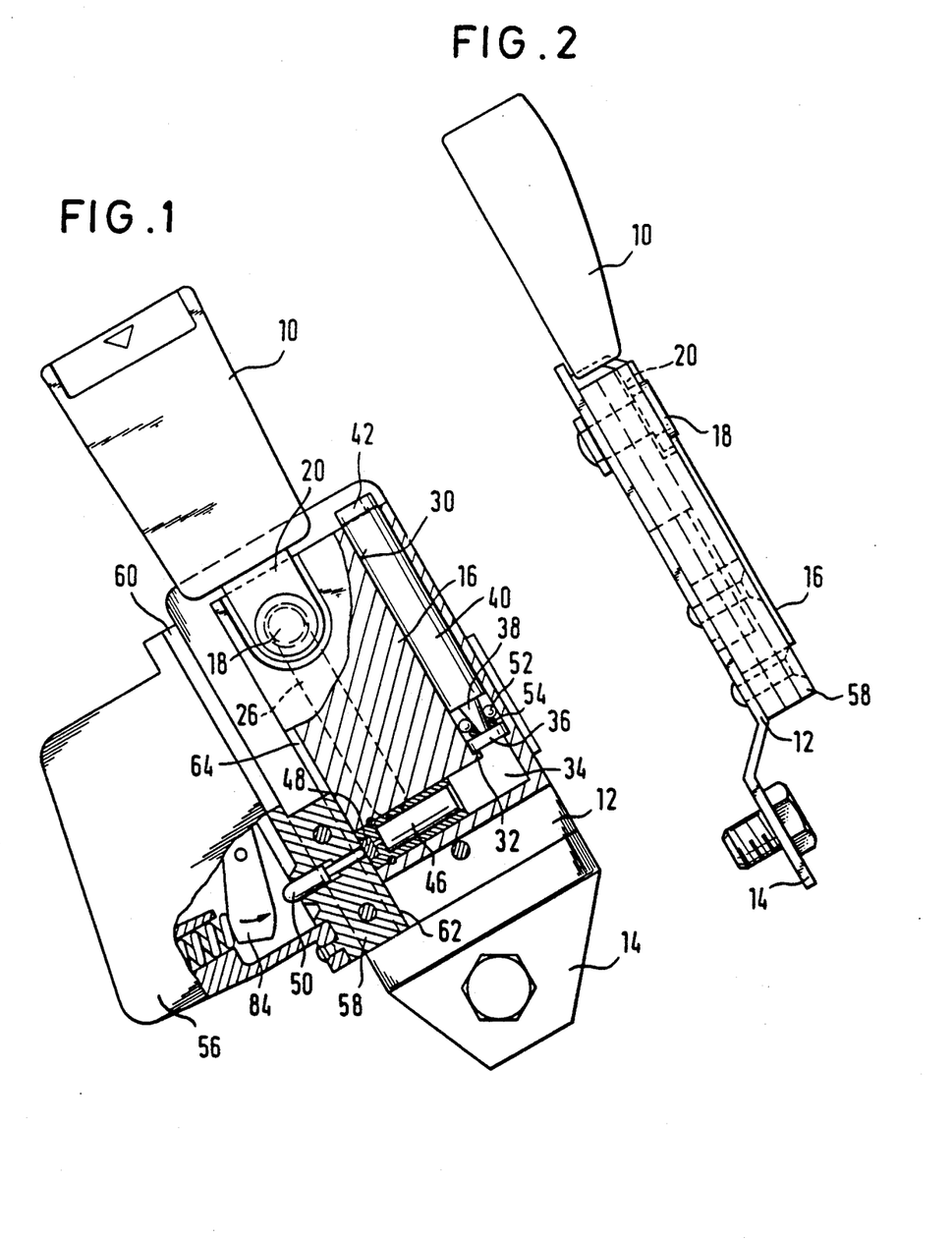
FIG. 1 is a partial section of a first embodiment of the tightening means.
FIG. 2 is a schematic side view of the tightening means of FIG. 1.

In the region of the conical shank 38 a free space is formed which is defined axially by a respective annular shoulder, radially inwardly by the surface of the shank 38 and radially outwardly by the inner surface of the cylinder 30. In said free space a plurality of roller elements 52 in the form of steel balls are arranged in the peripheral direction. The diameter of said roller elements 52 is substantially equal to the radial height of the free space receiving them in the centre of the shank 38. By means of a resilient O-ring 54 the roller elements 52 along the outer surface of the shank 38 are pressed into engagement with the inner wall of the cylinder 30.

Figure 3:
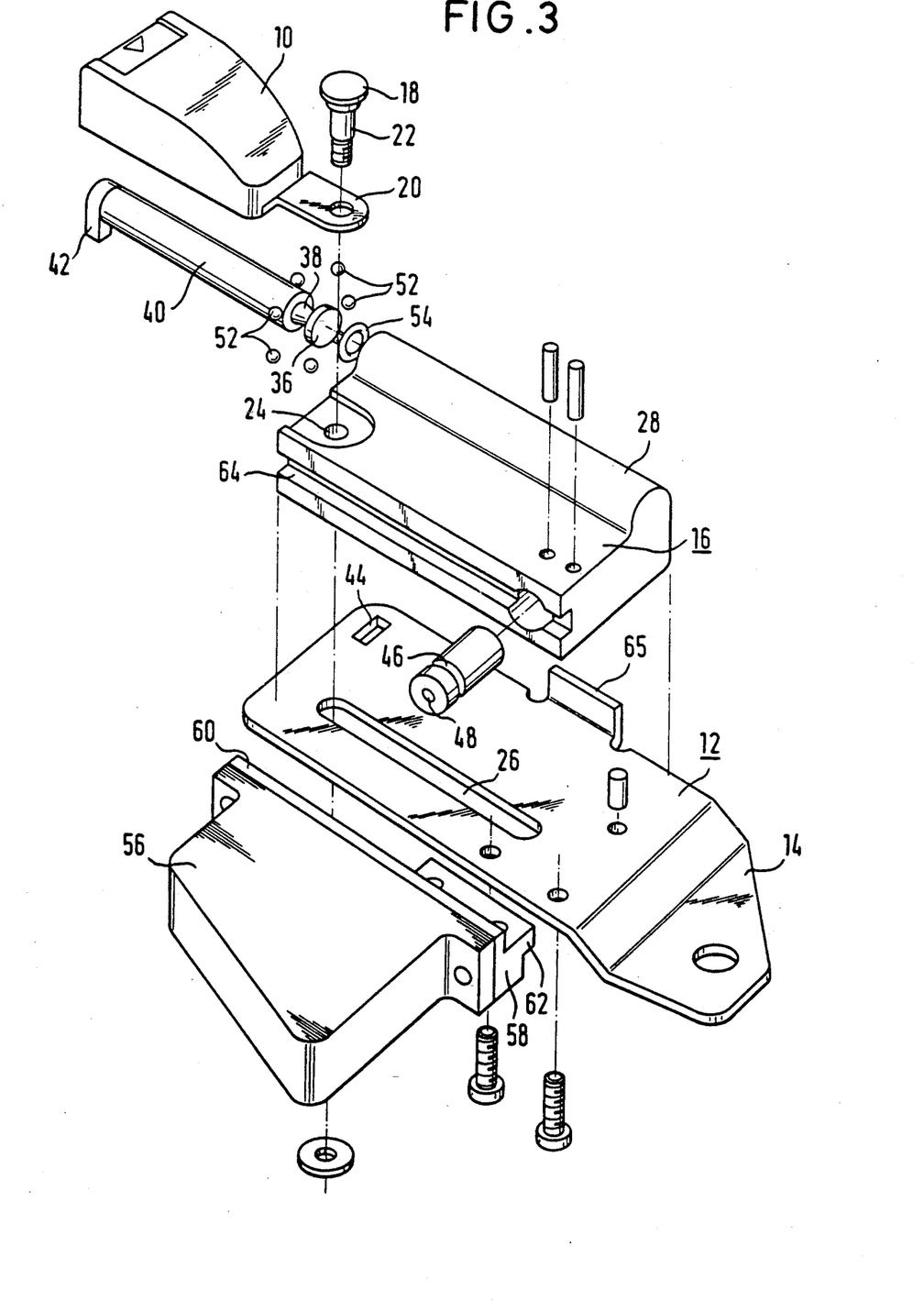
FIG. 3 is an exploded perspective view of the tightening means shown in FIGS. 1 and 2.

The firing mechanism to be described later in detail is accommodated in a flat housing 56 which is arranged with its one narrow side lying opposite the longitudinal edge of the cylinder block 16 remote from the cylinder 30 and via an angle piece 58 integrally formed on a bottom plate 60 of the housing 56 is secured to the guide plate 12. Integrally formed on the angle piece 58 is a guide strip 62 which engages into a groove 64 which is formed along the narrow edge of the cylinder block 16 remote from the cylinder 30. The guide plate 12 is provided on its side adjacent the cylinder 30 with a bent-up guide part 65 which lying opposite the guide strip 62 supports the cylinder block 16 and thus contributes to clean guiding thereof on the guide plate and between the guide strip 62 and the guide part 65.

The mode of operation of the tightening means described will now be explained in detail.

The readiness state shown in FIGS. 1 and 2 holds the belt lock 10 via the cylinder block 16 in an easy-to-operate position, for example at the side of a vehicle seat. The cylinder block 16 is disposed in an extreme position in which the shank 22 of the mounting pin 18 bears on the end of the longitudinal slot 26 remote from the fitting part 14. In this state the piston 36, the shank 38 and the piston rod 40 are completely immersed into the cylinder 30. The firing mechanism arranged in the housing 56 responds in vehicle-sensitive manner to vehicle retardations exceeding a predetermined magnitude to drive the firing pin 50 into the impact fuse 58 and fire the gas generator 46. The activated gas generator 46 generates pressurized gases which via the gas action passage 34 enter the cylinder 30 and drive the cylinder block 16 in the direction of the fitting part 14 because the piston 36 is supported at the guide plate 12. In this process the piston 36, the shank 38 and the piston rod 40 are shear stressed. The cylinder block 16 is now driven within a few milliseconds over the intended tightening distance which corresponds to the length of the longitudinal slot 26. The end of the tightening travel is reached when the shank 22 of the mounting pin 18 strikes the end of the longitudinal slot 26 adjacent the fitting part 14. The belt lock 10 is entrained by the cylinder block 16 and thus introduces the tightening force into the belt system.

After an effected tightening, in the belt system when the forward movement of the vehicle occupant begins high stress peaks can arise. To diminish these peaks, in the tightening means provided here the clamping blocking mechanism formed by the roller elements 52, the conical shank 38 and the inner wall of the cylinder 30 are not constructed as return blocking mechanism but as return brake. The diameter of the roller elements 52 and the material of which the cylinder block 16 is formed are adapted to each other in such a manner that the roller elements 52 penetrate up to a reproduceably defined depth into the wall of the cylinder 30 and deform the latter to form longitudinal grooves. In this manner each individual roller element 52 generates a readily controllable braking force. The total braking force is governed by the number of roller elements 52 and can thus be set via the number of roller elements to the desired magnitude. This return brake forms an energy converter by which the energy introduced into the belt system is converted to deformation work for plastic deformation of the material of the cylinder block 16.

Figure 7:
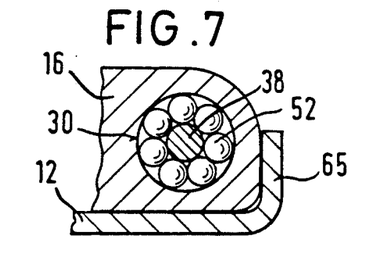
FIG. 7 is a cross-section of the piston/cylinder unit prior to the activation of a return brake associated therewith.
Figure 8:
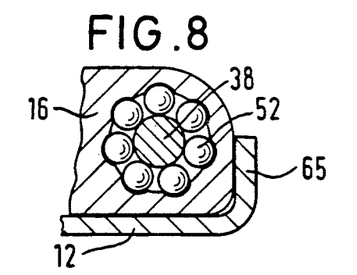
FIG. 8 shows a cross-section of the piston/cylinder unit when the function of the return brake is completed.

FIG. 7 shows the roller elements 52 surrounding the conical shank 38 bearing on the inner periphery of the cylinder 30 prior to activation of the gas generator 46; FIG. 8 shows the same roller elements 52 in a position which is pressed radially outwardly by the outer periphery of the shank 38 and in which they have penetrated into the material of the cylinder block 16 and have plastically deformed said material. The state shown in FIG. 8 occurs when after an effected tightening the return brake described has started to function. In the extreme case the cylinder block 16 will be moved back almost to its initial position, a considerable proportion of the energy introduced into the belt system then being converted to plastic deformation. The vehicle occupant is therefore protected in this manner from harmful stress or load peaks.

Figures 4, 5:
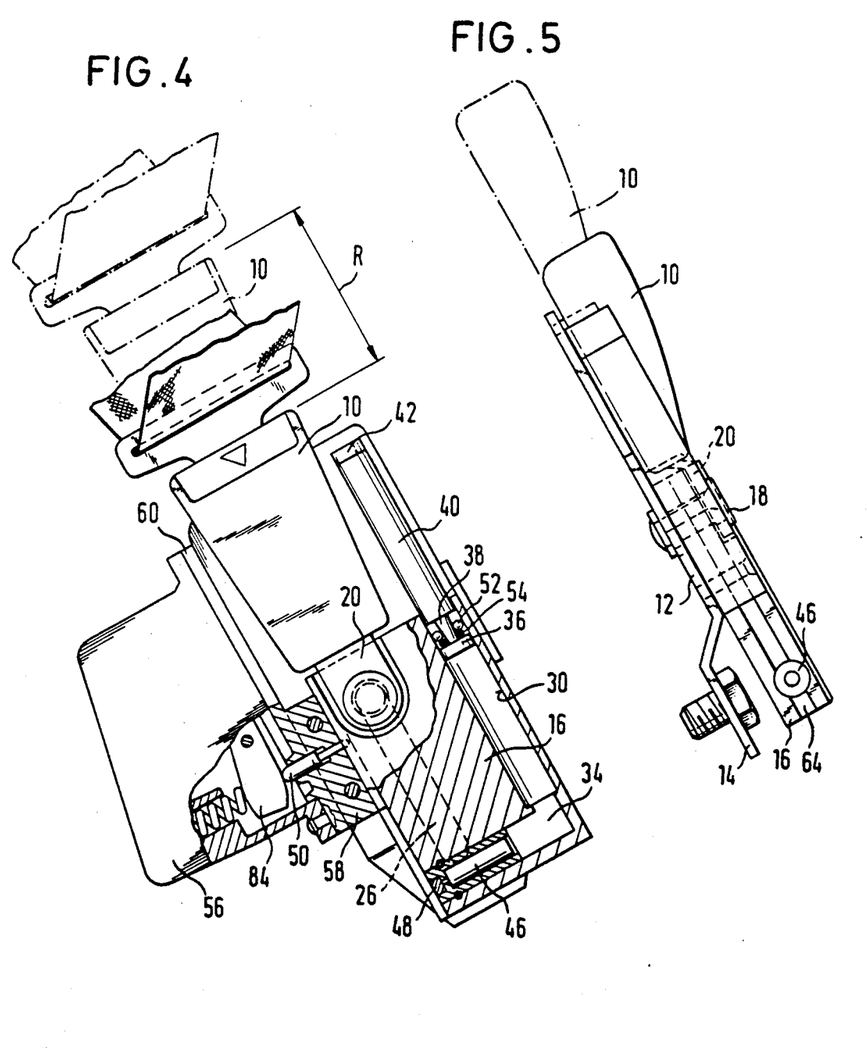
FIGS. 4 and 5 are a partial section and a schematic side view respectively for explaining the mode of operation of the tightening means shown in FIGS. 1 to 3.

In FIGS. 4 and 5 the tightening means is shown after an effected tightening in full lines whilst the position of the belt lock in the readiness position is shown in dashed lines. The tightening travel is indicated by the amount R which corresponds substantially to the length of the longitudinal slot 26. FIG. 5 shows that for the tightening movement of the cylinder block no construction space at all is required because in the tightening position the narrow edge of the cylinder block 16 remote from the belt lock 10 does not project beyond the end of the fitting part 14. Furthermore, FIG. 5 shows that the bending of the fitting part 14 is advantageous because as a result the mounting pin with which the fitting part 14 is anchored to the vehicle bodywork or to the vehicle seat is moved out of the path of the cylinder block 16.

Figure 6:
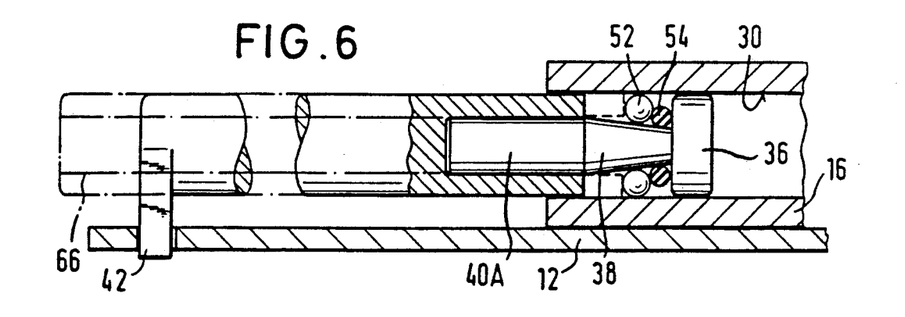
FIG. 6 is a schematic longitudinal section of a piston/cylinder unit of the tightening means.

FIG. 6 shows a step which facilitates the mounting of the cylinder 30 on the piston 36. The step consists in that onto the piston rod 40A a slit sleeve 66 is pushed which is slidable on said piston rod in the axial direction and with the piston 36 and piston rod 40A is inserted into the cylinder 30. Since the roller elements 52 are pressed by the resilient O-ring into their clamping position between the conical shank 36 and the inner wall of the cylinder 30, they oppose the relative movement between piston 36 and cylinder 30 in the insertion direction. The sleeve 66 is now pushed forwards on the piston rod 40A until its end adjacent the piston 36 bears on the roller elements 52 and acts against the resilient O-ring 54. The roller elements 52 cannot now develop any clamping action. When the assembly has been completed the sleeve 66 can be removed.

Figure 9:
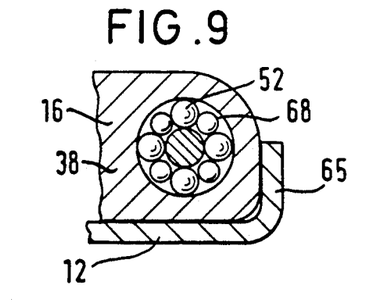
FIGS. 9 and 10 show cross-sections each of a constructional variant of the piston/cylinder unit.
Figure 10:
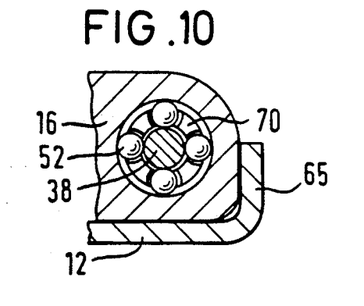
Figure 11:
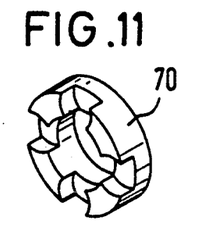
FIG. 11 is a perspective view of a cage for the roller elements visible in FIG. 10.

FIGS. 9 and 10 each show a constructional variant having only four roller elements 52. In the embodiment shown in FIG. 9 the roller elements 52 are spaced apart by balls 68 of small diameter. In the embodiment according to FIG. 10 the roller elements 52 are held in a cage 70 which is shown separately in FIG. 11 and keeps the roller elements 52 at uniform circumferential intervals from each other.

Figure 12:
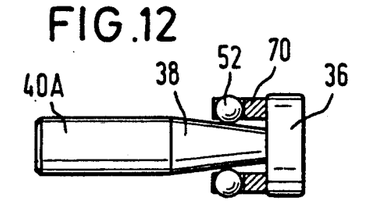
FIG. 12 is a schematic longitudinal section which shows the construction of an embodiment of the piston with piston rod and roller elements.

FIG. 12 shows the cage 70 in a function as resilient member which analogously to the resilient O-ring 54 in FIG. 6 biases the roller elements 52 against the inner surface of the cylinder 30.

Figure 13:
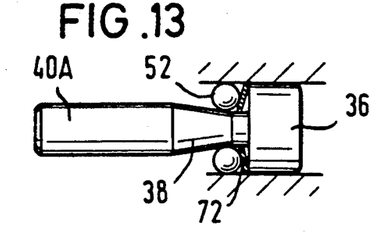
FIG. 13 shows a variant of the embodiment shown in FIG. 12.

In the embodiment according to FIG. 13 this action on the roller elements 52 is effected by a plate spring 72 which is arranged between the piston 36 and the roller elements 52.

Figure 15:
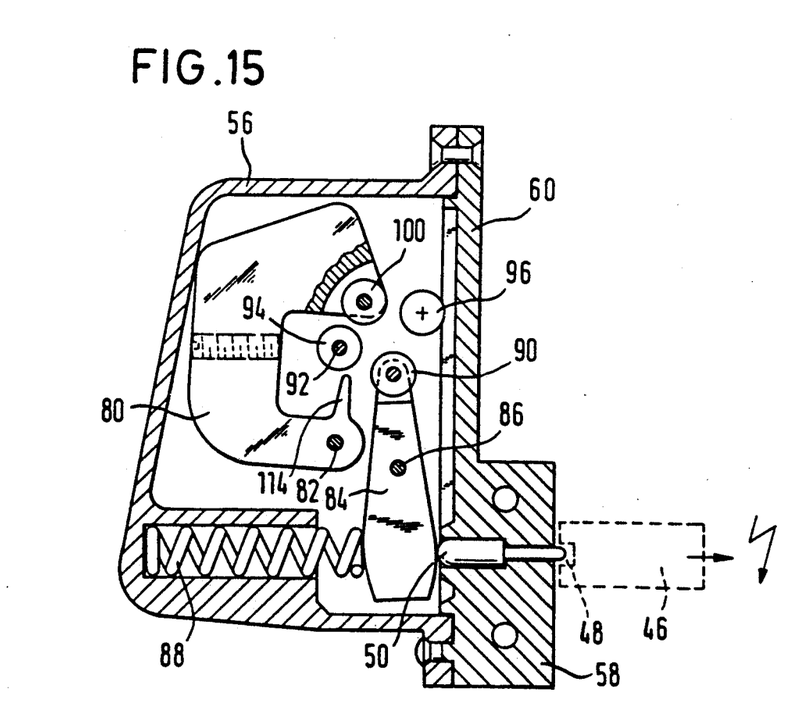
FIG. 15 shows the firing mechanism of FIG. 14 in the activated state.
Figure 16:
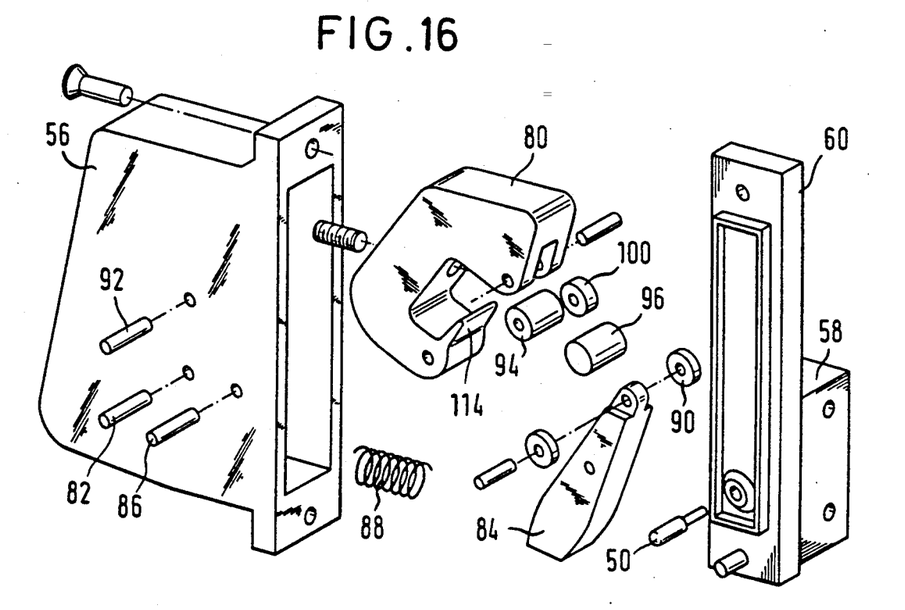
FIG. 16 shows an exploded perspective view of the firing mechanism shown in FIGS. 14 and 15.

The firing mechanism will now be described with reference to FIGS. 14 to 16.

In the interior of the flat housing 56 an inertia mass 80 in the form of a generally U-shaped stirrup member is disposed which is pivotally mounted on a housing-fixed pin 82 at the free end of the one leg. A strike piece 84 in the form of a two-armed lever is pivotally mounted on a housing-fixed pin 86. The one arm of the strike piece 84 is urged by a pressure spring 88 in the direction of the free end of the firing pin 50 lying opposite a distance away. At the free end of the other arm of the strike piece 84 a retaining roller 90 is rotatably mounted. Furthermore, a support roller 94 is rotatably mounted on a housing-fixed pin 92. Between the support roller 94 and the retaining roller 90 a loose blocking roller 96 is disposed. Finally, a release roller 100 is rotatably mounted at the free end of the other leg of the inertia mass 80.

Figure 17:
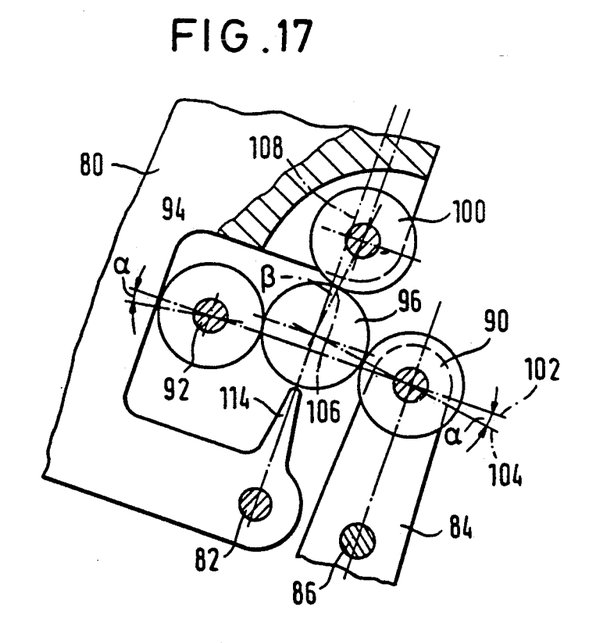
FIG. 17 is a schematic partial view of a trigger mechanism constructed as roller blocking mechanism.

Reference will now be made to FIG. 17. The loose blocking roller 96 is disposed between the rollers 90, 94 and 100 arranged at the corners of a triangle and bears with its outer periphery in each case on the outer periphery of said rollers. The retaining roller 90 is urged by the action of the pressure spring 88 against the outer periphery of the blocking roller 96 which in turn presses against the outer periphery of the release roller 100 because it is supported at the outer periphery of the support roller 94. The blocking roller 96 is disposed between the support roller 94 and the retaining roller 90 in an over-deadcentre position which is characterized in that the angle $\alpha$ between a straight line 102 through the centre points of the rollers 90 and 94 and the straight line 104 through the centre points of the rollers 90 and 96 has a magnitude of a few degrees. The roller 96 therefore tends to move towards the release roller 100. Said release roller 100 is in turn disposed in an over-deadcentre position which is characterized by an angle $\beta$ which is formed between a straight line 106 through the centre points of the rollers 96 and 100 and a straight line 108 which extends perpendicularly to the straight line 102 connecting the centre points of the rollers 94, 90. The release roller 100 cannot follow its tendency to move in the sense of increasing the angle $\beta$ because the inertia mass 80 bears with the inner face of its web connecting the two legs on the outer periphery of the support roller 94. It would be equally possible however for the inertia mass 80 to bear on another stop by which the release roller 100 is kept in a metastable position.

The inertia mass 80 forms a vehicle-sensitive release element. Under the action of a vehicle retardation due to its mass inertia it is pivoted in the direction of the arrow 110 (FIG. 14) about the pin 82 as soon as a predetermined inhibition threshold is overcome which is defined by the magnitude of the angles $\alpha$, $\beta$, the force of the spring 88 and the leverage of the strike piece 84 and can be exactly set. As soon as the inhibition threshold has been overcome, i.e. the release roller 100 has moved firstly in the sense of a reduction of the angle $\beta$ (FIG. 17) and then therebeyond, the pressure spring 88 assists the further pivoting of the inertia mass 80 in the direction of the arrow 110 (FIG. 14) so that the pivoting of the inertia mass 80 takes place with high angular acceleration. Within an extremely short period of time the release roller 100 releases the loose blocking roller 96 which is thrown out between the rollers 90, 94 and frees the path of the retaining roller 90 so that now the strike piece 84 under the action of the pressure spring 88 pivots in the direction of the arrow 112 and is driven against the adjacent free end of the firing pin 50. The firing pin 50 penetrates with its opposite free end into the impact fuse 48 and activates the gas generator 46. FIG. 15 shows this state.

Figure 14:
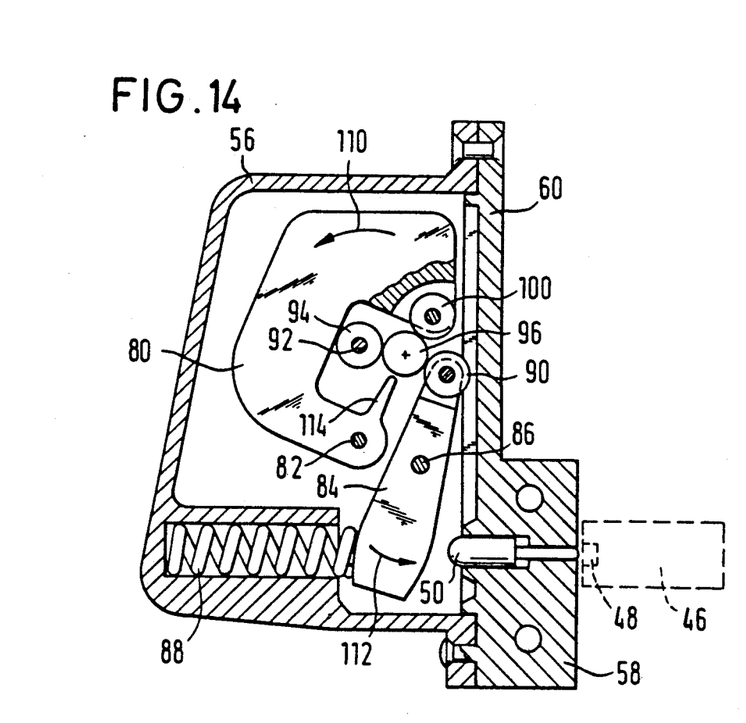
FIG. 14 is a schematic section of a mechanical firing mechanism, in the readiness state, which is suitable for use with the embodiment of the tightening means described.

To facilitate the assembly of the blocking roller 36 at the free end of the pivotally mounted leg of the inertia mass 80 a beak-like projection 114 is integrally formed which in the readiness position shown in FIG. 14 is directed towards the blocking roller 96 and ends a short distance from the latter.

Figure 18:
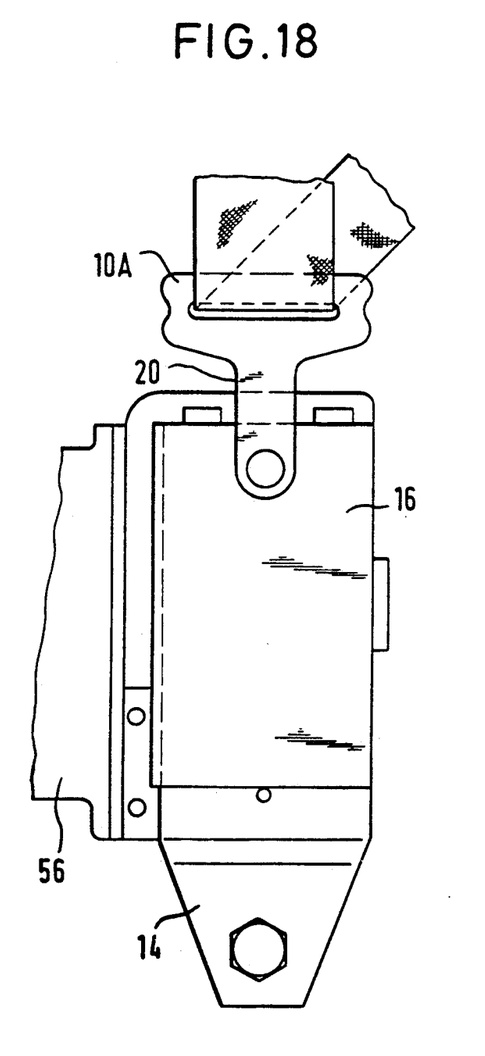
FIG. 18 is a schematic plan view of a further embodiment of the tightening means.

In the constructional variant of the tightening means shown in FIG. 18 a belt lock is not secured to the cylinder block 16 via the fitting part 20 but an end or deflection fitting 10A.

Figure 19:
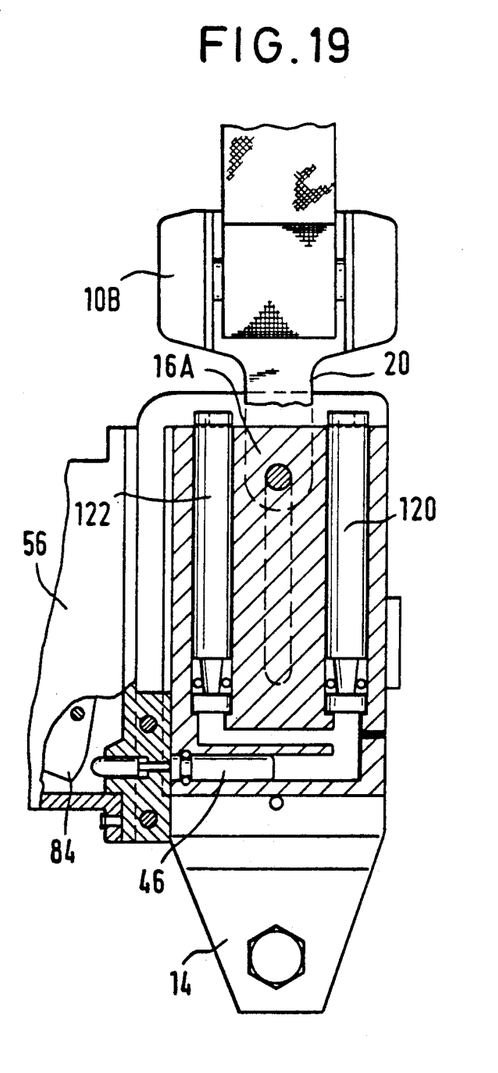
FIG. 19 is a schematic partial section of a third embodiment of the tightening means.

In the embodiment shown in FIG. 19 the piston/cylinder tightening drive is provided with two piston/cylinder units 120, 122 which are arranged parallel to and spaced from each other in the same cylinder block 16A along the longitudinal edges thereof and subjected to the action of a common pyrotechnical gas generator 46. Each individual piston/cylinder unit can be made of smaller diameter than the cylinder 30 in the embodiment according to FIGS. 1 to 5 so that the cylinder block 16A as a whole can have a smaller overall height.

As furthermore apparent from FIG. 19 a belt retractor 10B and not a belt lock is connected to the cylinder block 16A via the fitting part 20.

Otherwise the embodiments according to FIGS. 18 and 19 are not changed compared with the previously described embodiments and will therefore not be described in further detail.

Figures 20, 21:
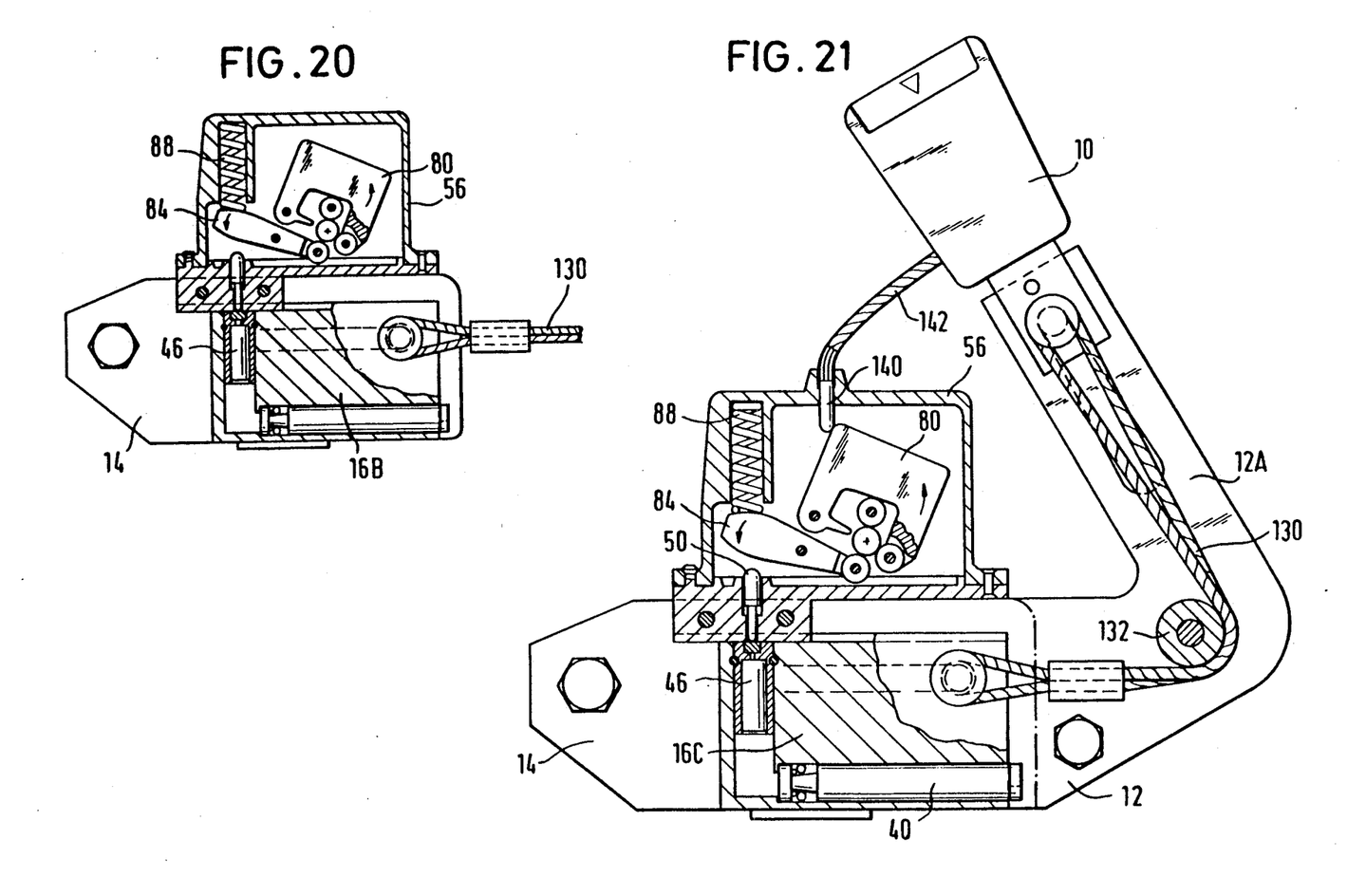
FIG. 20 is a partial section of a fourth embodiment.
FIG. 21 is a schematic partial section of a fifth embodiment of the tightening means.

The embodiments according to FIGS. 20 and 21 are also of basically the same structure as the embodiments previously described; they differ from the latter only in that the fitting part of the belt system does not directly engage the cylinder block 16B (FIG. 20) or 16C (FIG. 21) but via a flexible sheathed cable 130. In the embodiment according to FIG. 21 said sheathed cable 130 is moreover deflected by a deflection roller 132. The guide member 12 has an angled arm 12A on which the belt lock 10 is guided longitudinally displaceably and on which the deflection roller 32 is rotatably mounted. A further peculiarity of the embodiment shown in FIG. 21 is that the inertia mass 80 remains secured in its readiness position for as long as the belt system is not used. For this purpose a pin 140 engages the inertia mass 80, said pin being displaceably mounted in a housing bore of the housing 56 and projecting into the path of movement of the inertia mass 80 as long as no injection tongue is inserted into the belt lock 10. The insertion movement of the insertion tongue into the belt lock 10 is transmitted via a sheathed cable 142 to the pin 140 which is then withdrawn from the path of the inertia mass 80 and releases the latter. Since numerous embodiments of a securing are possible said securing is described here only symbolically.

A comparison of FIGS. 1 and 20 or 21 shows that although it responds in vehicle-sensitive manner the firing mechanism described is not restricted to a specific installation orientation. An installation orientation is favourable in which the straight line running through the centre of gravity and the pivot axis of the inertia mass 80 forms an angle of about 45° with the vertical. The firing mechanism can then be installed unchanged turned through 90° as well.

I claim:

1. A tightening means for a safety belt restraining system in a vehicle, the restraining system including a first fitting to be anchored to the vehicle body and a second fitting to be connected to a belt portion of the restraining system, said tightening means comprising:
a pyrotechnic drive including a cylinder block having a cylindrical wall for defining a cylinder bore therein, said cylinder bore having a longitudinal axis;
a piston slidably received in said cylinder bore and a piston rod connected to said piston;
said cylinder block being connected to said second fitting and said piston rod being connected to said first fitting;
a guide plate connected to said first fitting, said cylinder block being slidably mounted on said guide plate;
a pyrotechnic gas generator;
a vehicle sensitive trigger mechanism for activating said gas generator; and
an accommodation bore for receiving said gas generator in said cylinder block and communicating with said cylinder bore;
said gas generator, when activated, producing gas under pressure to move said cylinder block in a first direction with respect to said piston and piston rod, along said guide plate, while said piston and piston rod remain stationary.

2. A tightening means according to claim 1, wherein said cylinder block comprises a flat plate at least approximately rectangular in plan view and having a first longitudinal edge, said flat plate having said cylinder bore defined therein along said first longitudinal edge, and said cylinder bore having a piston receiving first end which is connected to a gas action passage and a second end which is open to atmosphere.

3. A tightening means according to claim 2, wherein said flat plate has a narrow transverse edge and said gas action passage is arranged transversely with respect to the axis of said cylinder bore along said narrow transverse edge, said gas action passage having an end remote from said cylinder for receiving said pyrotechnic gas generator.

4. A tightening means for a safety belt restraining system in a vehicle, the restraining system including a first fitting to be anchored to the vehicle body and a second fitting to be connected to a belt portion of the restraining system, said tightening means comprising:
a pyrotechnic drive including a cylinder block having a cylindrical wall for defining a cylinder bore therein, said cylinder bore having a longitudinal axis;
a piston slidably received in said cylinder bore and a piston rod connected to said piston;
said cylinder block being connected to said second fitting and said piston rod being connected to said first fitting;
a guide plate connected to said first fitting, said cylinder block being slidably mounted on said guide plate;
a pyrotechnic gas generator;
a vehicle sensitive trigger mechanism for activating said gas generator; and
an accommodation bore for receiving said gas generator in said cylinder block and communicating with said cylinder bore;
said gas generator, when activated, producing gas under pressure to move said cylinder block in a first direction with respect to said piston and piston rod, along said guide plate, while said piston and piston rod remain stationary;
said guide plate having a longitudinal slot extending parallel to the axis of said cylinder bore, a fitting part being secured to said cylinder block by means of a bolt, said bolt having a shank which passes through said longitudinal slot.

5. A tightening means for a safety belt restraining system in a vehicle, the restraining system including a first fitting to be anchored to the vehicle body and a second fitting to be connected to a belt portion of the restraining system, said tightening means comprising:
a pyrotechnic drive including a cylinder block having a cylindrical wall for defining a cylinder bore therein, said cylinder bore having a longitudinal axis;
a piston slidably received in said cylinder bore and a piston rod connected to said piston;
said cylinder block being connected to said second fitting and said piston rod being connected to said first fitting;
a guide plate connected to said first fitting, said cylinder block being slidably mounted on said guide plate;
a pyrotechnic gas generator;
a vehicle sensitive trigger mechanism for activating said gas generator; and
an accommodation bore for receiving said gas generator in said cylinder block and communicating with said cylinder bore;
said gas generator, when activated, producing gas under pressure to move said cylinder block in a first direction with respect to said piston and piston rod, along said guide plate, while said piston and piston rod remain stationary;
said cylinder block comprising a flat plate at least approximately rectangular in plan view and having a first longitudinal edge, said flat plate having said cylinder bore defined therein along said first longitudinal edge, and said cylinder bore having a first piston receiving end which is connected to a gas action passage and a second end which is open to atmosphere;
said cylinder block having a second longitudinal edge remote from and shorter than said first longitudinal edge, said second longitudinal edge having a groove, formed therein, a guide strip being secured to said guide member and slidably engaged in said groove.

6. A tightening means according to claim 1, wherein an annular space is defined between said piston and said piston rod, said annular space being defined axially by respective annular shoulders of said piston and said piston rod, said annular space being defined radially inwardly by a conical surface the minor base of which is disposed adjacent said piston, said annular space being defined radially outwardly by said cylinder wall, said tightening means further comprising a plurality of roller elements disposed in said annular space and engaging said conical surface and said cylinder wall at a location spaced axially between and approximately equidistant from said annular shoulders.

7. A tightening means according to claim 6, wherein said roller elements form in conjunction with said cylinder wall a return brake, wherein upon movement of said cylinder block with respect to said piston and piston rod in a second direction opposite to said first direction said roller elements penetrate into the material of said cylinder wall to deform said cylinder wall plastically and form longitudinal grooves therein, thereby resisting movement of said cylinder block relative to said piston rod in said second direction.

8. A tightening means according to claim 7, wherein the number and diameter of said roller elements and the material of said cylinder wall are selected in such a manner that a reproducibly defined return braking force is generated.

9. A tightening means according to claim 8, wherein said roller elements are equally circumferentially spaced around said cylinder wall and within said annular space.

10. A tightening means for a safety belt restraining system in a vehicle, the restraining system including a first fitting to be anchored to the vehicle body and a second fitting to be connected to a belt portion of the restraining system, said tightening means comprising:
   a pyrotechnic drive including a cylinder block having a cylindrical wall for defining a cylinder bore therein, said cylinder bore having a longitudinal axis;
   a piston slidably received in said cylinder bore and a piston rod connected to said piston;
   said cylinder block being connected to said second fitting and said piston rod being connected to said first fitting;
   a guide plate connected to said first fitting, said cylinder block being slidably mounted on said guide plate;
   a pyrotechnic gas generator;
   a vehicle sensitive trigger mechanism for activating said gas generator; and
   an accommodation bore for receiving said gas generator in said cylinder block and communicating with said cylinder bore;
   said gas generator, when activated, producing gas under pressure to move said cylinder block in a first direction with respect to said piston and piston rod, along said guide plate, while said piston and piston rod remain stationary;
   said pyrotechnic drive including two parallel piston/cylinder units which are disposed spaced apart in said cylinder block and which are each operable by said one pyrotechnic gas generator.

11. A tightening means according to claim 1, comprising a flexible sheathed cable interconnecting said cylinder block and a longitudinally displaceably guided fitting part.

12. A tightening means for a safety belt restraining system in a vehicle, the restraining system including a first fitting to be anchored to the vehicle body and a second fitting to be connected to a belt portion of the restraining system, said tightening means comprising:
   a pyrotechnic drive including a cylinder block having a cylindrical wall for defining a cylinder bore therein, said cylinder bore having a longitudinal axis;
   a piston slidably received in said cylinder bore and a piston rod connected to said piston;
   said cylinder block being connected to said second fitting and said piston rod being connected to said first fitting;
   a guide plate connected to said first fitting, said cylinder block being slidably mounted on said guide plate;
   a pyrotechnic gas generator having an impact fuse;
   a vehicle sensitive trigger mechanism for activating said gas generator; and
   an accommodation bore for receiving said gas generator in said cylinder block and communicating with said cylinder bore;
   said gas generator, when activated, producing gas under pressure to move said cylinder block in a first direction with respect to said piston and piston rod, along said guide plate, while said piston and piston rod remain stationary;
   said tightening means further comprising a mechanical firing mechanism operatively connected with said pyrotechnic gas generator, said firing mechanism including:
   a pivotally mounted vehicle sensitive inertia mass;
   a pivotally mounted strike piece and a spring biasing said strike piece into a first position;
   a firing pin having a first end disposed adjacent said impact fuse of said gas generator and a second end disposed adjacent said strike piece; and
   a trigger mechanism movable between a first condition in which said trigger mechanism holds said strike piece in its first position spaced from said second end of said firing pin and a second condition in which, upon vehicle sensitive pivoting of said inertia mass after overcoming an inhibition threshold, said trigger mechanism releases said strike piece, said spring then biasing said strike piece into engagement with said second end of said firing pin to move said firing pin to effect firing of said gas generator.

13. A tightening means according to claim 12, wherein said trigger mechanism includes a roller blocking mechanism for blocking movement of said strike piece, comprising:
   a retaining roller mounted at an end of said strike piece remote from said firing pin;
   a release roller mounted on said inertia mass;
   a support roller rotatably fixed to said housing; and
   a loose blocking roller maintained, when said trigger mechanism is in said first condition, between said retaining roller, said release roller, and said support roller;
   and wherein said blocking roller, when said trigger mechanism is in said first condition, assumes between said retaining roller and said support roller an over-deadcenter position in which said blocking roller is held by said release roller, said release roller in turn being disposed in an over-dead center position in which said release roller is blocked from movement.

14. A tightening means according to claim 13, wherein said support roller blocks said release roller from movement.

15. A tightening means according to claim 13, wherein said inertia mass comprises a generally U-shaped stirrup member having first and second legs, said stirrup member being pivotally mounted to said housing at an end of said first leg, said release roller being rotatably secured to an end of said second leg of said stirrup member.

16. A tightening means according to claim 15 wherein said stirrup member comprises at an end of said first leg a projection projecting toward said blocking roller and spaced a slight distance from said blocking roller.

17. A tightening means according to claim 15 wherein said stirrup member has a portion extending between and interconnecting said legs, said support roller being disposed between said legs of said stirrup member, said connecting portion of said stirrup member engaging the periphery of said support roller.

18. A tightening means according to claim 12, comprising:
a securing means for maintaining said trigger mechanism in its first condition by blocking movement of said inertia mass, and
means for rendering said securing means inoperative upon use of said safety belt restraining system by a vehicle occupant.

19. A tightening means according to claim 12, comprising a flat housing having said mechanical firing mechanism therein, said flat housing having a narrow side through which said firing pin extends, said narrow side of said flat housing being disposed opposite a narrow side of said cylinder block and being secured to said guide member.

20. Apparatus for tightening a belt portion of a vehicle safety belt system, the system including a first fitting for connection with the vehicle body and a second fitting for connection with the belt portion of the safety belt system, comprising pyrotechnic drive means for tightening the belt portion, said pyrotechnic drive means comprising:
a cylinder block fixed to the second fitting and slidably connected with the first fitting, said cylinder block having a cylinder wall defining therein a cylinder chamber having a longitudinal axis;
a piston slidably received in said cylinder chamber;
a piston rod fixed to the first fitting and to said piston; and
gas generating means for, when actuated, generating gas to move said cylinder block in a first direction relative to said piston and said piston rod to tighten the belt portion, said piston and said piston rod remaining stationary upon actuation of said gas generating means.

* * * * *

UNITED STATES PATENT AND TRADEMARK OFFICE
CERTIFICATE OF CORRECTION

PATENT NO. : 5,104,193

DATED : April 14, 1992

INVENTOR(S) : Artur Fohl

It is certified that error appears in the above-identified patent and that said Letters Patent is hereby corrected as shown below:

Column 9, Line 47, Claim 4, change "cylindrical" to --cylinder--.

Column 10, Line 12, Claim 5, change "cylindrical" to --cylinder--.

Column 11, Line 18, Claim 10, change "cylindrical" to --cylinder--.

Column 11, Line 55, Claim 12, change "cylindrical" to --cylinder--.

Signed and Sealed this

Twenty-ninth Day of June, 1993

Attest:

MICHAEL K. KIRK

*Attesting Officer*     *Acting Commissioner of Patents and Trademarks*